United States Patent [19]

Berry et al.

[11] Patent Number: 5,896,406
[45] Date of Patent: Apr. 20, 1999

[54] SHIFT REGISTER-BASED XOR ACCUMULATOR ENGINE FOR GENERATING PARITY IN A DATA PROCESSING SYSTEM

[75] Inventors: Stephen W. Berry, Littleton, Mass.; Randy M. Arnott, Mont Vernon, N.H.

[73] Assignee: Adaptec, Inc., Milpitas, Calif.

[21] Appl. No.: 08/829,044

[22] Filed: Mar. 31, 1997

[51] Int. Cl.[6] .................................................. G06F 11/10
[52] U.S. Cl. .................................. 371/49.2; 371/49.1
[58] Field of Search ........................ 371/49.2, 48, 49.1

[56] References Cited

U.S. PATENT DOCUMENTS

4,669,084  5/1987  Hartman et al. ......................... 371/43
5,335,235  8/1994  Arnott ................................... 371/49.2

*Primary Examiner*—Phung M. Chung
*Attorney, Agent, or Firm*—Cesari & McKenna, LLP

[57] ABSTRACT

An exclusive OR (XOR) accumulator engine efficiently generates parity from a group of data blocks temporarily stored in a memory of a data processing system. The XOR engine comprises an XOR logic circuit coupled to a multi-stage shift register for accumulating parity calculations generated by the logic circuit. Accumulation of parity within the shift register continues until all of the data blocks within the group have been processed by the logic circuit; thereafter, the data blocks and their generated parity are stored on multiple disks of the data processing system.

16 Claims, 5 Drawing Sheets

SHIFT REGISTER-BASED XOR ACCUMULATOR ENGINE FOR GENERATING PARITY IN A DATA PROCESSING SYSTEM

FIELD OF THE INVENTION

This invention relates generally to parity protection in a data processing system and, more particularly, to an arrangement for efficiently generating parity in a memory controller of a data processing system.

BACKGROUND OF THE INVENTION

Parity protection techniques are often employed in data processing systems to ensure data integrity and protect against data loss. The data to be protected are typically divided into chunks or blocks of data that are further organized into data groups, each of which consists of a fixed number of data blocks. For a data processing system having a plurality of data storage devices, e.g., a redundant array of independent disks (RAID), each block of data is stored on a different disk with data blocks from several different data groups being stored on a single disk.

In the context of a RAID implementation, parity protection denotes a type of checksum that allows regeneration of unreadable data in a block by evaluating a function of the data values stored in positionally corresponding data blocks that are not in error. A memory controller of the data processing system generally performs such an evaluation, typically in connection with a Booleon exclusive OR (XOR) function. The XOR function is applied bit-by-bit to positionally corresponding bits in each data block of a group and the result is stored in a positionally corresponding bit of a parity block. The parity block for each data grop is then stored on one of the disks containing the data group that the parity block protects.

Figure 1:
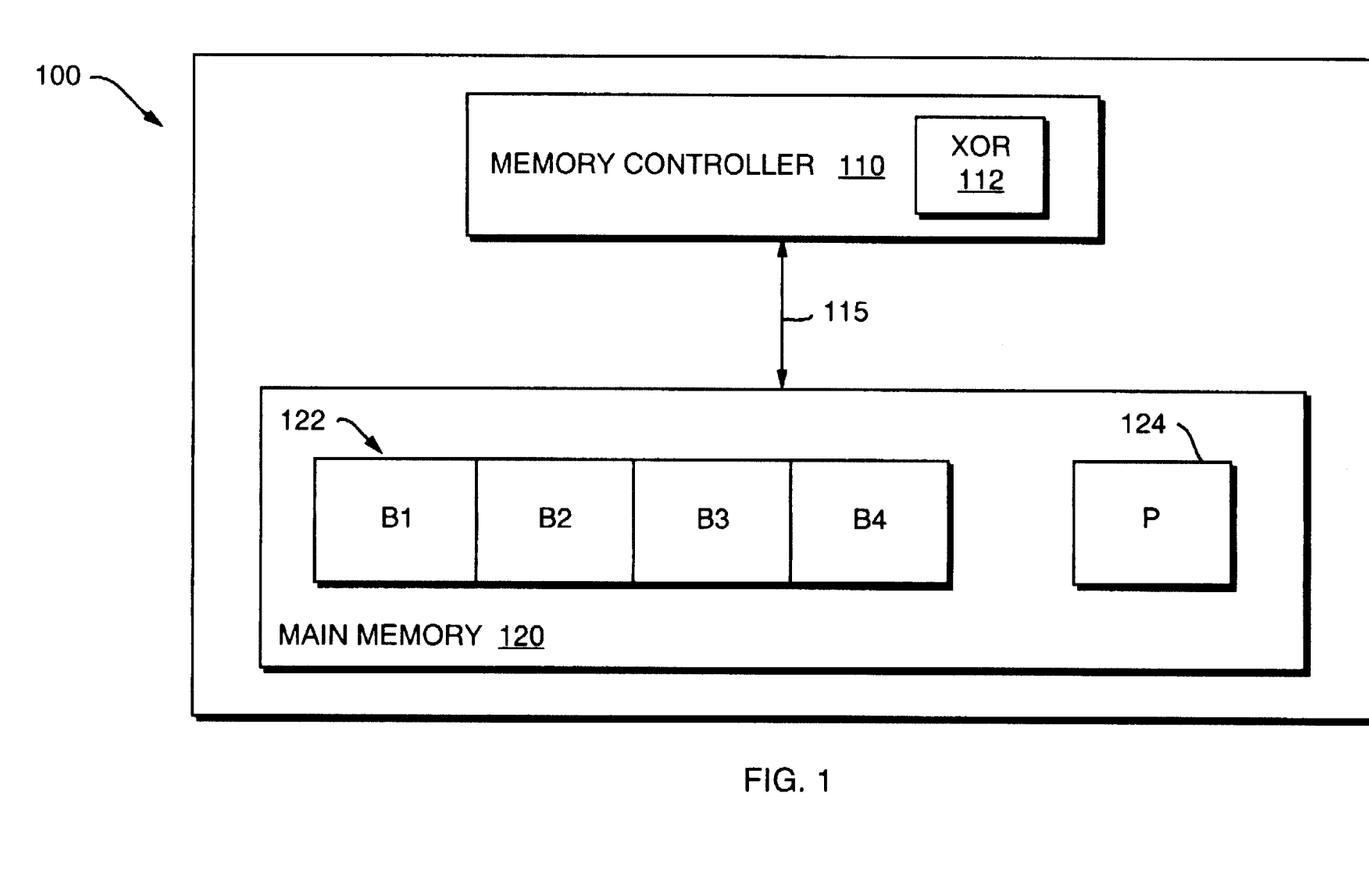
FIG. 1 is a block diagram of a data processing system that may be used in a conventional RAID implementation.

FIG. 1 is a block diagram of a data processing system 100 that may be used in a conventional RAID implementation. The system 100 comprises a main memory 120 coupled to a memory controller 110 via a memory bus 115. The main memory includes storage locations 122 for holding data blocks B1–B4 of a data group transferred from a plurality of disks (not shown) and the controller contains an XOR function 112 for performing parity operations on the data blocks. The results of the parity operations are then stored in a location 124 in memory 120.

The memory controller typically calculates parity for the data blocks by way of a series of read and write operations over the memory bus 115. For example, B1 is acquired from memory via a read access (R1) over the bus 115, B2 is acquired via a read access (R2) over the bus, parity is calculated from these blocks and the partial result is stored in buffer 124 via a write access (Wp) over the bus. Likewise, data block B3 is acquired via a read bus access (R3), the parital parity result is retrieved via a read bus access (Rp), parity is calculated from these blocks and the partial result is stored via a write bus access (Wp). Finally, B4 is acquired via a read bus access (R4), the parital parity result is retrieved via a read bus access (Rp), parity is calculated from these blocks and the total parity result is stored via a write access (Wt) over the bus. Table 1 summarizes these bus operations required to calculate parity for the data blocks B1–B4.

Table 1

B1⊕B2=R1, R2, Wp

B3⊕P=R3, Rp, Wp

B4⊕P=R4, Rp, Wt

As can be seen from the table, nine (9) memory accesses over memory bus 15 are needed to calculate parity for the data blocks of the group. Parity calculations requiring read and write bus accesses by the memory controller 110 to main memory 120 are time consuming and, thus, inefficient. It is therefore desirable to reduce the number of memory bus accesses required for a memory controller to calculate parity for data blocks stored in a memory of a data processing system. The present invention is generally directed to an arrangement for reducing those bus accesses and increasing the effciency of the parity calculation process.

One known technique for generating parity blocks for use in a computer system is described in U.S. Pat. No. 5,335,235, titled *FIFO Based Parity Generator* by Arnott and issued on Aug. 2, 1994. The first-in first-out (FIFO) based parity generator is coupled to a general purpose data bus and comprises a series of 1-bit parity circuits. Each parity circuit includes a FIFO logic block comprising a ring buffer with read and write address counters. The ring buffer, in turn, comprises a series of 1-bit memory locations with a data signal input and a data signal output of the FIFO block. The read and write address counters are activated to deliver their contents to the ring buffer in response to respective read and write control signals.

The FIFO-based parity generation technique is generally complex in terms of the control needed to manage read and write data operations to and from the ring buffer. That is, the address counters and other supporting logic circuits required to implement the FIFO advance a rather complex and expensive parity generator design. Accordingly, the present invention is directed to an inexpensive arrangement for increasing the efficiency of parity calculations in a data processing system.

SUMMARY OF THE INVENTION

The invention relates to an exclusive OR(XOR) accumulator engine for efficiently generating parity from a group of data blocks temporarily stored in a memory of a data processing system. Broadly stated, the XOR engine comprises an XOR logic circuit coupled to a multi-stage shift register for accumulating parity calculations generated by the logic circuit. Accumulation of parity within the shift register continues until all of the data blocks within the group have been processed by the logic circuit; thereafter, the data blocks and their generated parity are stored on multiple disks of the data processing system.

In the illustrative embodiment of the present invention, the XOR accumulator engine is contained within a memory controller of the system and may be used to ensure the integrity of data stored on the multiple disks using known redundant array of independent disk (RAID) techniques. The sizes of the data blocks used in connection with these techniques may vary, depending upon the specific RAID application. Therefore, in accordance with an aspect of the present invention, the depth of the shift register may be dynamically adjusted to accomodate different sizes of data blocks.

Specifically, the shift register is arranged as a plurality of cascaded storage elements interrupted by a bypass circuit to create first and second register stages. The bypass circuit preferably comprises a tap multiplexer having a first input that couples to an output of the first stage, a second input that bypasses the first stage of the register and an output that connects to an input of the second stage. In response to a control signal generated by a state machine of the engine, the tap multiplexer selects one of the inputs to dynamically adjust the depth of the register to conform with the size of a data block loaded into the register.

By accumulating parity calculations within the memory controller, the inventive XOR engine advantageously reduces the number of accesses to the memory of the data processing system, thereby providing a substantial performance improvement over prior systems. Indeed, the extent of the performance improvement increases as additional disks are used in the data processing system. Moreover, use of a shift register as an accumulator for the XOR engine is less expensive and easier to implement than the ring buffer approach of the prior art.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 2:
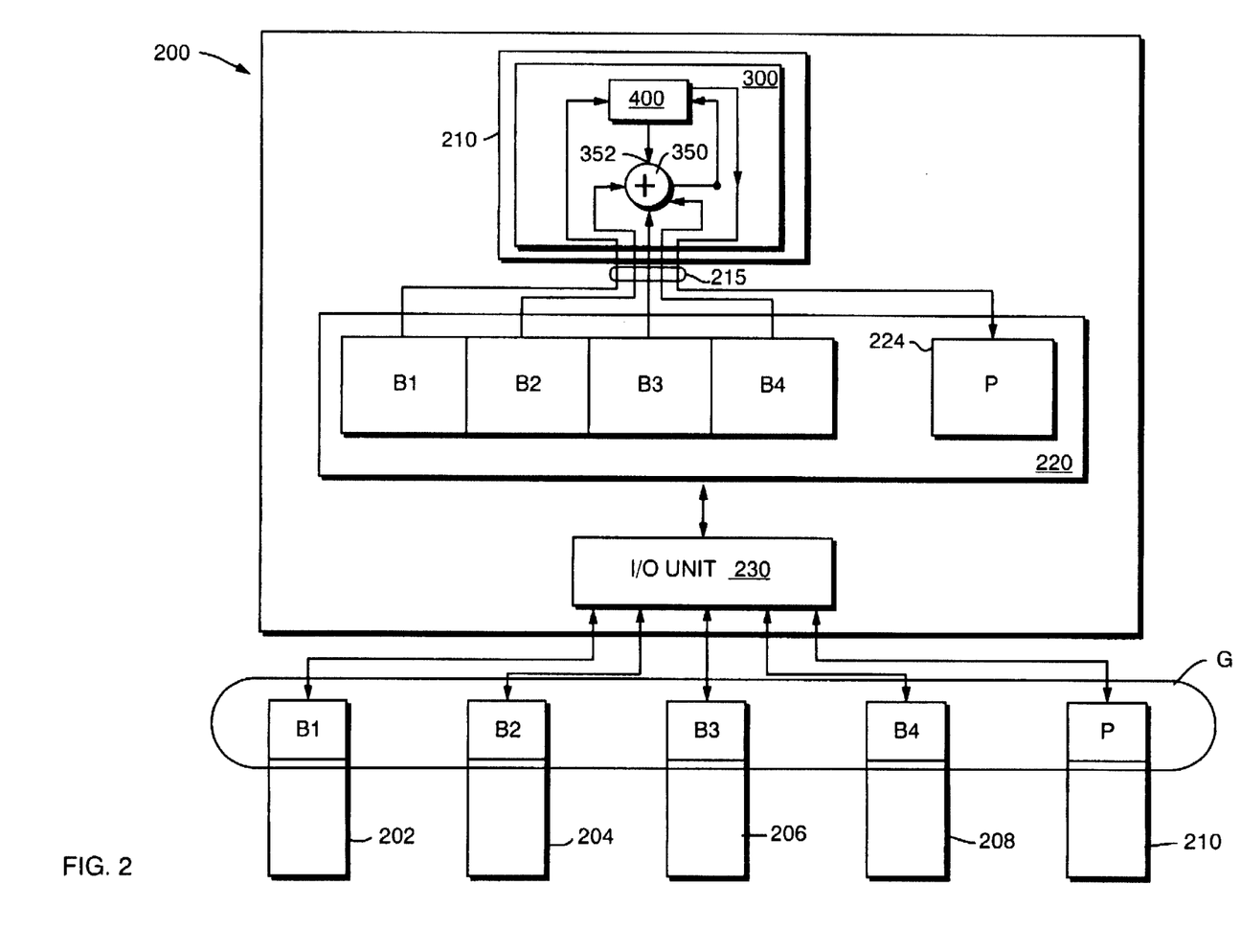
FIG. 2 is a block diagram of a data processing system that may be advantageously used with an exclusive OR(XOR) accumulator engine of the present invention.

FIG. 2 is a block diagram of a data processing system 200 including a plurality of disks configured for a RAID implementation that may be advantageously used with an exclusive OR (XOR) accumulator engine 300 of the present invention. The data processing system 200 includes five disks 202–210, four of which contain data blocks B1–B4 and the other of which contains a parity block P for data group G. The disks connect to a main memory 220 through an input/output (I/O) unit 230 configured to perform memory access operations to store the data blocks B1–B4 in memory. A memory bus 215 couples the memory to a memory controller 210.

The XOR accumulator engine 300 is preferably located on the controller 210 and generally comprises a storage buffer 400, such as a shift register, coupled to an XOR function 350 for generating parity calculations. The XOR function 350 may comprise an XOR logic circuit, although those skilled in the art will recognize that any circuit configuration capable of providing an exclusive OR Booleon operator function may be used in connection with the teachings described herein. The shift register 400 is dimensioned to store a chunk or block of data equal to the size of each data block B1–B4. The size of each data block, in turn, is preferably equal to the size of a sector of a disk which, in the illustrative embodiment described herein, comprises 4 K bytes.

According to the invention, the register 400 functions as an accumulator circuit to accumulate parity calculations provided by the XOR logic circuit 350. For example, the memory controller obtains a first block of data B1 from memory and stores it in shift register 400, and then obtains a second block of data B2. The output of buffer 400, e.g. data block B1, is fed to a feedback input 352 of the XOR logic circuit 350 while the data block B2 is provided to as an input to the circuit 350; the circuit then performs an XOR operation on the data and stores the results in the register. At this point, the memory controller 210 would typically transfer, i.e., "flush", the contents of the register to memory; however since the register functions an accumulator, those contents are not flushed.

A third block of data B3 is thus retrieved by the memory controller and provided as another input to circuit 350 as the output of the shift register is fed back to input 352. The circuit 350 then performs an XOR operation on that data and stores the results in the register 400. Lastly, a fourth block of data B4 is retrieved from memory and provided as yet another input to XOR circuit 350 as the output of the register is fed back to input 352. Circuit 350 performs an XOR operation of that data and stores the results in shift register 400. At this point, the contents of the buffer are flushed to memory and, thereafter, stored on the parity disk.

The inventive technique thus requires a total of five (5) accesses to memory over memory bus 215: a read access of block 1 (R1), a read access of block 2 (R2), a read access of block 3 (R3), a read access of block 4 (R4) and a write access for the resulting parity block (Wp). In accordance with the invention, accumulation of parity calculations within the XOR engine of the memory controller advantageously reduces the number of accesses to the memory, thereby providing a substantial performance improvement over prior systems.

Figure 3:
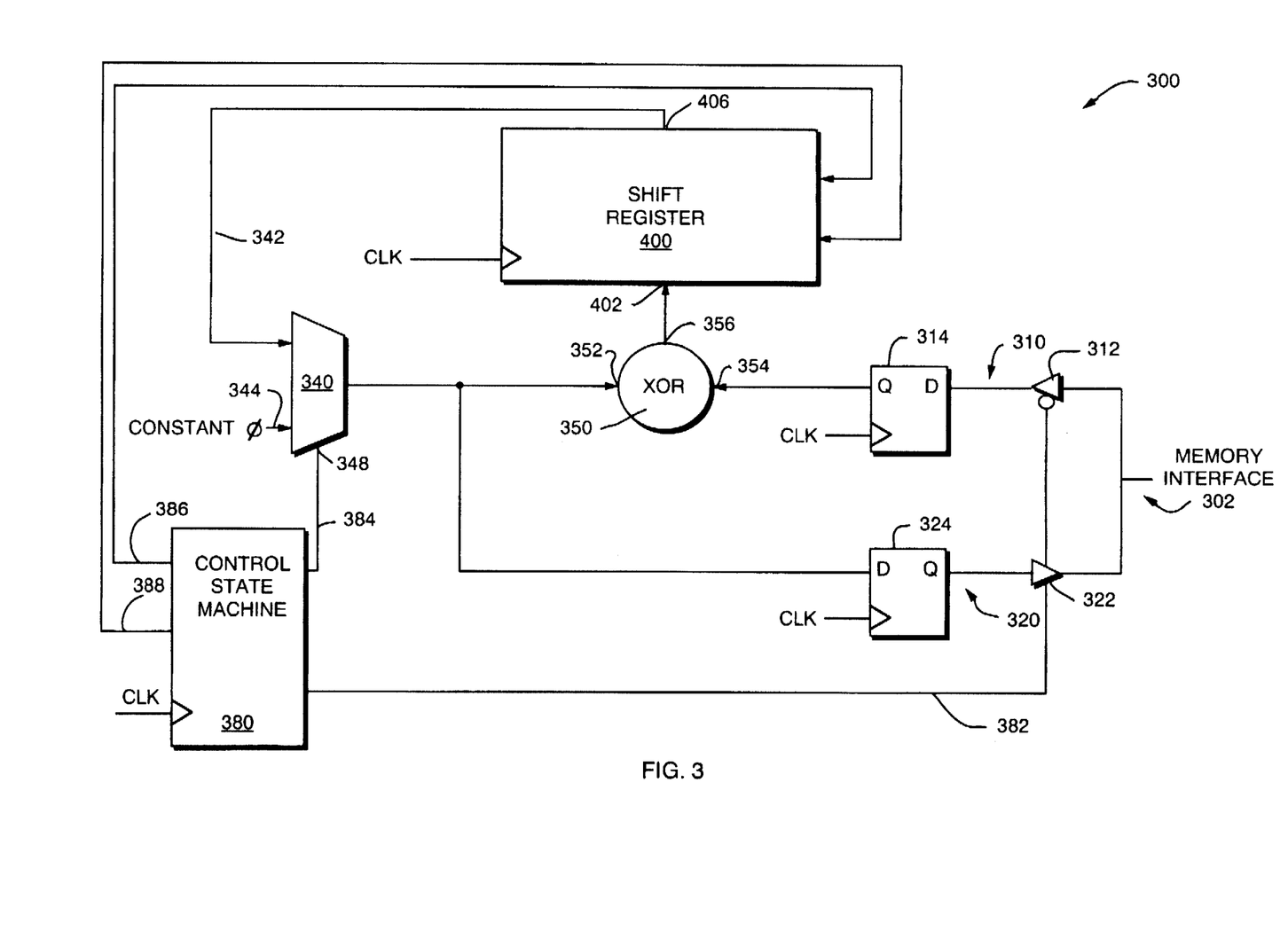
FIG. 3 is a detailed block diagram of the XOR accumulator engine of the present invention.

FIG. 3 is a detailed block diagram of the XOR accumulator circuit 300 including the shift register 400 which, in the illustrative embodiment, is a multi-stage shift register. A bi-directional memory interface 302 includes an input data path 310 and an output data path 320 coupled to the XOR logic circuit 350; each path comprises a driver 312, 322 coupled to a latch 314, 324. Preferably, the latches are D-type flip-flops and the drivers are tri-state buffer circuits. The tri-state buffers are enabled by a control signal on line 382 generated by a control state machine 380 of the engine 300.

An output 356 of the logic circuit 350 is connected to an input 402 of the register 400 and an output 406 of the register 400 is coupled to a feedback input 342 of a mutiplexer 340. The other input 344 of the multiplexer is labelled constant 0 and provides a stream of logical "0" values to an input 352 of the XOR circuit 350; when processed by the XOR circuit, this stream allows the buffer to be loaded with the data provided from the memory interface 302. The multiplexer 340 selects between the inputs 342, 344 in response to a control signal provided to an enable input 348 over line 384 generated by the control state machine 380.

Specifically, the control state machine 380 generates the control signal on line 384 to select the constant 0 input 344 to the multiplexer 340 prior to loading the first block of data into the register 400; as a result, a stream of logical "0" values are fed to input 352 of the XOR logic circuit 350. The first data block B1 is obtained ("read") from memory by enabling the input driver 312 and loading the data into the input latch 314; the output of that latch is fed to input 354 of the XOR logic circuit. The logic circuit 350 performs an XOR operation on the two input streams and loads the results into the register 400; that is, each data bit of the data block is logically XORed with a logical "0" value and each result is serially loaded into the register 400 until the entire register is loaded. Control state machine 380 generates control signals over lines 386, 388 to enable loading of the register 400; in addition, the state machine 380 includes an internal circuit, such as a counter (not shown), for determining when the register is fully loaded.

It will be understood to those skilled in the art that the control state machine 380 may comprise registers and combinational logic configured to produce a sequential logic circuit for controlling the XOR accumulator circuit and generating the signals described herein. The data paths of the engine 300 are configured to match the size of data blocks used in, inter alia, the bus and file subsystems of the system 200. Accordingly, the width of the shift register 400 is equivalent to the width of the memory bus 215 (e.g., 8-bytes) while the total storage capacity of the register is equal to the block size (e.g., 4 K bytes). In addition, the flip-flops of the memory interface 302 are "clocked" devices to increase their performance primarily because memory devices are relatively slow compared to the logic of circuit 350. A clock signal CLK used to clock these devices is preferably generated by a conventional clock generator (not shown).

After the first block is loaded, a read operation to memory is performed to acquire the second block B2. Meanwhile, the control state machine 380 generates a control signal over line 384 that switches between the constant 0 input 344 of the multiplexer 340 and the feedback input 342 from the register 400. Each bit of data of the second block B2 is then logically XORed with its respective data bit of the first block B1 (i.e., the first data bit from the output 406 of the register) and the results are loaded back into the register 400 until the register is entirely loaded. This process continues for blocks B3 and B4, at which time the contents of the register, i.e., the total parity data, are flushed to memory. The input 342 selected to the multiplexer 340 is not switched because the output 406 of the shift register 400 is present on the output data path 320. The buffer 400 is clocked to shift the data into the output latch 324 and through the output driver 322 to memory 220.

According to an aspect of the invention, the entire storage capacity of the register 400 is utilized to quickly and efficiently generate parity calculations for blocks of data. Configuring the XOR accumulator engine 300 to operate only on data blocks with a size equal to the total storage capacity of the register 400 unduly limits the extensibility of the engine with respect to different block sizes. Accordingly, a bypass circuit is provided within the shift register to create a plurality of stages that enables the XOR accumulator engine to operate on a plurality of data block sizes, e.g., a 512 byte block and a 4 K byte block.

Figure 4:
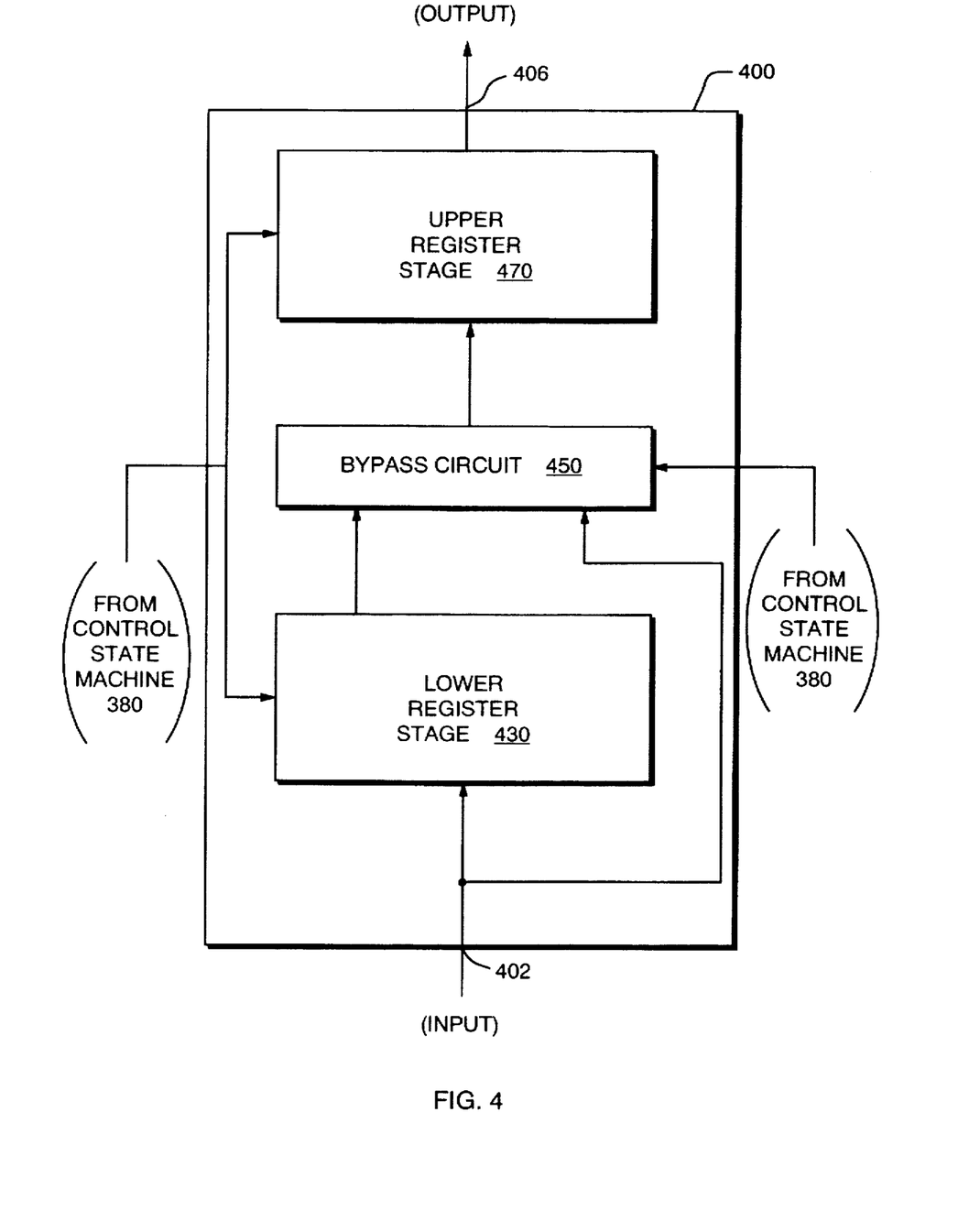
FIG. 4 is a block diagram of an embodiment of the XOR accumulator engine including a multi-stage storage buffer.

FIG. 4 is a block diagram of the shift register 400 including bypass circuit 450. In the illustrative embodiment of the invention, the bypass circuit 450 couples a first lower stage 430 of the register to a second upper stage 470. Functionally, the bypass circuit 450 may be configured to vary the size of the register 400 by steering data provided at the input 402 of register 400 directly into the upper stage 470, thereby bypassing the lower stage 430.

Figure 5:
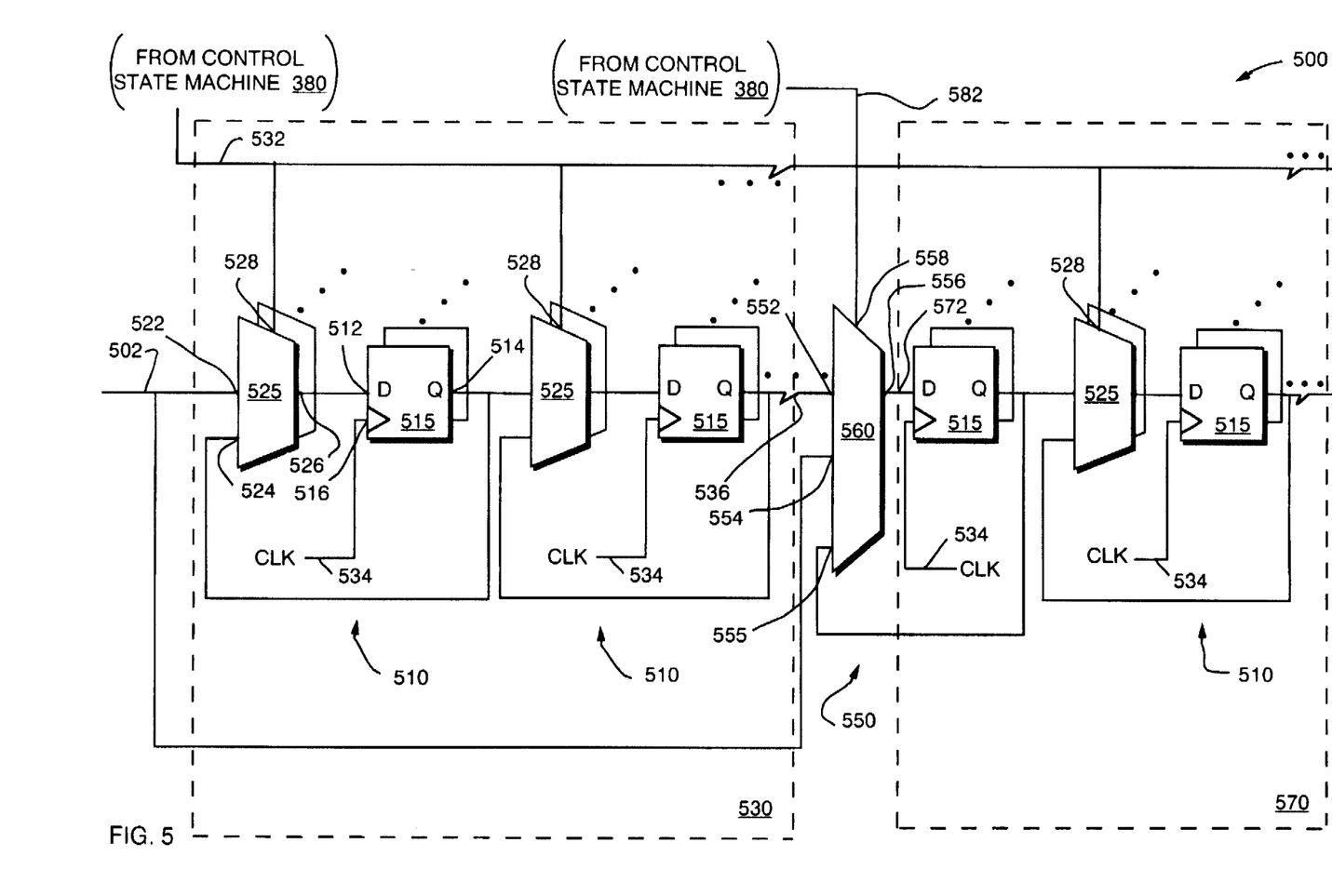
FIG. 5 is a block diagram of a multi-stage shift register according to the present invention.

As noted, the shift register 400 is illustratively implemented as a multi-stage shift register, preferably within in a gate array circuit. FIG. 5 is block diagram of the internal organization of the multi-stage shift register 500. The shift register 500 is arranged as a plurality of cascaded storage elements 510 interrupted by a bypass circuit 550 to create first and second register stages 530, 570. In the illustrative embodiment, the register 500 is organized with a 64-bit data path; thus, each storage element 510 may comprise a set of sixty-four (64) 1-bit flip-flops 515 configured as a register segment coupled to associated segment multiplexers 525.

Specifically, a data input 522 of a first segment multiplexer 525 receives data provided to the input 502 of the shift register 500; an output 526 of the segment multiplexer 525 is coupled to a data (D) input 512 of flip-flop 515. A (Q) output 514 of the flip-flop is thereafter fed to the data input of a second segment multiplexer 525. Each segment multiplexer also has a feedback input 524 connected to the Q-output of its associated flip-flop. The control state machine 380 generates a control signal over line 532 to an enable input 528 of each segment multiplexer 525 which selects between the feedback and data inputs of the multiplexer. Each flip-flop 515 of the register segment is clocked by a clock signal CLK on line 534 and, depending upon the input selected to multiplexer 525, data is either held at the flip-flop or shifted through the elements 510 of register 500.

The bypass circuit 550 preferably comprises a tap multiplexer 560 having a data input 552 that couples to an output 536 of the first stage 530, a bypass input 554 that bypasses the first stage 530 of the register by intercepting data provided at the input 502 of the register 500 and an output 556 that connects to an input 572 of the second stage 570. In addition, the tap multiplexer 560 has a feedback input 555 connected to the Q-output of a first flip-flop 515 of the second stage 570; in the illustrative embodiment, the tap multiplexer also functions as the segment multiplexer associated with this flip-flop of the register segment.

An enable input 558 of the multiplexer 555 is connected to control state machine 380 over line 582. In response to a control signal generated by the state machine over line 582, the multiplexer 555 is configured to either load data into its associated flip-flop when shifting data among the storage elements or to feed data present at the Q-output of the flip-flop back to the D-input of the flop so as to hold its state when not shifting. Furthermore, the control signal on line 582 may configure the tap multiplexer 555 to select between inputs 552, 554 to dynamically adjust the depth of the register 500 to conform with the size of a data block loaded into the register 500.

In summary, the XOR accumulator engine reduces the number of accesses to the memory during parity operations by accumulating the parity calculations within the memory controller, thereby providing a substantial performance improvement over prior systems. Notably, the extent of the performance improvement increases as additional disks are used in the data processing system. Moreover, use of a shift register as an accumulator for the XOR engine is less expensive and easier to implement than the ring buffer approach of the prior art.

While there has been shown and described an illustrative embodiment for efficiently generating parity from a group of data blocks using an XOR engine having a multi-stage shift register as an accumulator, it is to be understood that various other adaptations and modifications may be made within the spirit and scope of the invention. For example in an alternate embodiment of the invention, various configurations of the shift register (and engine) data path can be employed, particularly for a specified (default) data block size. It will be understood to those skilled in the art that increasing the width of the data path decreases the depth of the register for the specified block size. Although the illustrative embodiment specifies a block size of 4 K bytes because of the specific bus and file subsystems employed in the data processing system described herein, the XOR engine may be easily configured to operate with other block sizes, such as 512 bytes or 1 K bytes.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. An exclusive OR (XOR) accumulator engine for efficiently generating parity from a group of data blocks stored in memory of a data processing system, the XOR accumulator engine comprising:

an XOR logic circuit for processing the data blocks to generate parity calculations; and a multi-stage shift register coupled to the XOR logic circuit, the multi-stage shift register accumulating the generated parity calculations until all of the data blocks within the group are processed by the XOR logic circuit and thereafter providing the generated parity calculations to the memory the multi-stage shift register being configured to dynamically adjust a depth of the register to accommodate different sizes of the data block.

2. The XOR accumulator engine of claim 1 wherein the XOR logic circuit has a plurality of inputs coupled to a plurality of data sources and wherein the multi-stage shift register has an input coupled to an output of the XOR logic circuit.

3. The XOR accumulator engine of claim 2 wherein one of the plurality of data sources is an output of the multi-stage shift register coupled to one of the plurality of inputs of the XOR logic circuit, and wherein another of the plurality of data sources is the memory for providing the data blocks to another of the plurality of inputs of the XOR logic circuit.

4. The XOR accumulator engine of claim 1 wherein the register comprises a bypass circuit configured to create first and second stages of the multi-stage register, whereby to permit the register to accommodate the different sizes of the data blocks.

5. The XOR accumulator engine of claim 4 wherein the bypass circuit comprises a tap multiplexer having a first input that couples to an output of the first stage, a second input that bypasses the first stage by intercepting data provided at an input of the multi-stage register and an output connected to an input of the second stage.

6. The XOR accumulator engine of claim 5 further comprising a control state machine for generating control signals used to control operations within the engine.

7. The XOR accumulator engine of claim 6 wherein a first control signal generated by the state machine configures the tap multiplexer to select one of its first and second inputs to dynamically adjust the depth of the register to conform with a size of a data block loaded into the input of the multi-stage register.

8. The XOR accumulator engine of claim 7 wherein the multi-stage shift register comprises a plurality of cascaded storage elements interrupted by the tap multiplexer.

9. The XOR accumulator engine of claim 8 wherein each storage element comprises a set of flip-flops coupled to associated segment multiplexers.

10. The XOR accumulator engine of claim 9 wherein the set of flip-flops are configured as a register segment.

11. The XOR accumulator engine of claim 10 wherein the memory comprises a bi-directional memory interface having an input data path and an output data path coupled to a plurality of inputs of the XOR logic circuit.

12. The XOR accumulator engine of claim 11 wherein each of the input and output data paths comprises a driver coupled to a latch.

13. The XOR accumulator engine of claim 12 wherein the latch is a D-type flip-flop and the driver is a tri-state buffer circuit, and wherein the tri-state buffer circuit is enabled by a second control signal generated by the control state machine.

14. A exclusive OR(XOR) accumulator engine of a memory controller, the XOR accumulator engine having an XOR logic circuit for efficiently generating parity from a group of data blocks having a predetermined size, the XOR accumulator engine comprising:

a multi-stage shift register having a depth for accumulating the generated parity, the shift register having (i) an input of a first stage coupled to an output of the XOR logic circuit for receiving the generated parity, (ii) an output of a second stage coupled to an input of the XOR logic circuit for delivering the generated parity to the XOR logic circuit, and (iii) a bypass circuit for intercepting the generated parity received at the input of the first stage and providing the generated parity to an input of the second stage, the bypass circuit dynamically adjusting the depth of the shift register to accomodate a different predetermined size of the data blocks.

15. The exclusive XOR accumulator engine of claim 14 wherein the multi-stage shift register comprises a plurality of cascaded storage elements.

16. The exclusive XOR accumulator engine of claim 15 wherein the bypass circuit is a tap multiplexer configured and arranged to interrupt the plurality of cascaded storage elements.

* * * * *

UNITED STATES PATENT AND TRADEMARK OFFICE
CERTIFICATE OF CORRECTION

PATENT NO. : 5,896,406
DATED : April 20, 1999
INVENTOR(S) : Stephen W. Berry, et al.

It is certified that error appears in the above-identified patent and that said Letters Patent is hereby corrected as shown below:

On the title page item [57], line 1, change "exclusive" to --exclusive--.

Column 7, line 23, change "memory the" to --memory, the--.

Column 8, line 27, change "OR(XOR)" to --OR (XOR)--.

Signed and Sealed this

Twenty-eighth Day of September, 1999

Attest:

Q. TODD DICKINSON

*Attesting Officer*     *Acting Commissioner of Patents and Trademarks*